(12) United States Patent
Takizawa et al.

(10) Patent No.: US 10,374,474 B2
(45) Date of Patent: Aug. 6, 2019

(54) PERMANENT MAGNET MOTOR

(71) Applicant: Mitsubishi Electric Corporation, Tokyo (JP)

(72) Inventors: Yuji Takizawa, Tokyo (JP); Satoru Akutsu, Tokyo (JP); Masafumi Okazaki, Tokyo (JP); Hiroshi Aida, Tokyo (JP); Yu Hirotani, Tokyo (JP); Kazumasa Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/575,422

(22) PCT Filed: Sep. 30, 2015

(86) PCT No.: PCT/JP2015/077739
§ 371 (c)(1),
(2) Date: Nov. 20, 2017

(87) PCT Pub. No.: WO2017/056233
PCT Pub. Date: Apr. 6, 2017

(65) Prior Publication Data
US 2018/0198330 A1 Jul. 12, 2018

(51) Int. Cl.
*H02K 21/12* (2006.01)
*H02K 1/27* (2006.01)
(Continued)

(52) U.S. Cl.
CPC .............. *H02K 1/274* (2013.01); *H02K 1/16* (2013.01); *H02K 1/27* (2013.01); *H02K 21/14* (2013.01);
(Continued)

(58) Field of Classification Search
CPC ............ H02K 1/274; H02K 1/16; H02K 1/17; H02K 1/27; H02K 21/14; H02K 2201/06
(Continued)

(56) References Cited

U.S. PATENT DOCUMENTS

2005/0258698 A1* 11/2005 Miyashita .............. H02K 1/278
310/156.38
2006/0131976 A1* 6/2006 Kikuchi ................. H02K 1/276
310/156.46
(Continued)

FOREIGN PATENT DOCUMENTS

JP 2013-106370 A 5/2013
JP 5434415 B2 3/2014
(Continued)

OTHER PUBLICATIONS

International Search Report of PCT/JP2015/077739 dated Dec. 22, 2015 [PCT/ISA/210], English Translation.
(Continued)

*Primary Examiner* — Thanh Lam
(74) *Attorney, Agent, or Firm* — Sughrue Mion, PLLC; Richard C. Turner

(57) ABSTRACT

It has been discovered that torque ripples can be reduced by adopting a shape in which: the width of a shoe connection formed in a stator of a permanent magnet motor is equal to or smaller than the thickness of each of core pieces constituting a stator core; and a relationship of $0.7 \leq Wm/(Tm \times Gm) \leq 3.3$ is satisfied, where Wm is the length of the long side of a flat plate-shaped permanent magnet embedded in a rotor, Tm is the length of the short side of the permanent magnet, and Gm is the maximum distance from the outer circumference of the rotor to the permanent magnet.

4 Claims, 6 Drawing Sheets

(51) Int. Cl.
*H02K 21/14* (2006.01)
*H02K 1/16* (2006.01)
*H02K 29/03* (2006.01)

(52) U.S. Cl.
CPC ......... *H02K 29/03* (2013.01); *H02K 2201/06* (2013.01)

(58) Field of Classification Search
USPC ............ 310/156.38, 156.45–156.46, 156.53, 310/156.56
See application file for complete search history.

(56) References Cited

U.S. PATENT DOCUMENTS

| | | | |
|---|---|---|---|
| 2011/0012465 A1* | 1/2011 | Kawamura | H02K 1/276 310/156.53 |
| 2011/0050022 A1* | 3/2011 | Li | H02K 1/276 310/156.46 |
| 2011/0062814 A1 | 3/2011 | Adaniya et al. | |
| 2012/0091845 A1* | 4/2012 | Takemoto | H02K 1/276 310/156.01 |
| 2012/0242182 A1* | 9/2012 | Yabe | H02K 1/276 310/156.53 |
| 2013/0119805 A1 | 5/2013 | Higuchi | |
| 2014/0210296 A1 | 7/2014 | Miyashita | |
| 2015/0303749 A1 | 10/2015 | Okubo et al. | |

FOREIGN PATENT DOCUMENTS

| | | |
|---|---|---|
| JP | 2014-093914 A | 5/2014 |
| JP | 2014-150626 A | 8/2014 |

OTHER PUBLICATIONS

Communication dated Mar. 8, 2019, from the European Patent Office in counterpart European Application No. 15905387.5.
Communication dated Apr. 2, 2019, from the National Intellectual Property Office of the P.R.C. In counterpart Application No. 201580083193.4.

* cited by examiner

US 10,374,474 B2

PERMANENT MAGNET MOTOR

CROSS REFERENCE TO RELATED APPLICATIONS

This application is a National Stage of International Application No. PCT/JP2015/077739, filed Sep. 30, 2015, the contents of which are incorporated herein by reference in its entirety.

TECHNICAL FIELD

The present invention relates to a permanent magnet motor, and more particularly, to a permanent-magnet embedded motor having a rotor with permanent magnets embedded therein.

BACKGROUND ART

In this type of a permanent-magnet embedded motor, a plurality of permanent magnets are embedded in a rotor so as to be adjacent to each other in the circumferential direction of the rotor. In each pair of the adjacent permanent magnets in the circumferential direction of the rotor, the magnetic poles thereof are different from each other. In the surrounding area of a portion where the magnetic poles of each pair of the adjacent permanent magnets are switched, an abrupt change in magnetic flux density occurs. This causes a torque ripple which leads to vibration and noise.

There have been various methods for reducing such a torque ripple. For example, as described in Patent Document 1, recessed and projecting portions or the like are formed at predetermined positions of magnetic-pole switching portions between permanent magnets on the outer circumferential surface of a rotor.

CITATION LIST

Patent Document

Patent Document 1: Japanese Patent No. 5434415

SUMMARY OF THE INVENTION

Problems to be Solved by the Invention

In conventional permanent magnet motors, torque ripples are reduced with the above configuration, for example. Accordingly, when the outer diameter of a rotor core facing an air gap changes due to mold wear, etc., a rotor surface that directly faces the inner diameter of the stator changes. This results in a problem of causing a great change in torque ripple. For this reason, in order to inhibit variation generated during a manufacturing process from having an influence on a torque ripple, the torque ripple needs to be reduced using, for example, the positions of magnets inside a rotor, which do not directly face a stator inner circumference.

Solution to the Problems

A permanent magnet motor according to the present invention includes: a stator including a stator core obtained by stacking annular core pieces each having a plurality of teeth, and including an armature having windings housed in slots formed between the plurality of teeth; and a rotor which is arranged inside the stator with a magnetic gap therebetween and which rotates about a rotary shaft, the rotor having a permanent magnet which is embedded therein and has a flat plate-like cross section, wherein the permanent magnet motor has flange parts provided on rotor-side ends of the teeth, and has connection portions at which the respective flange parts are connected to each other in the circumferential direction of the stator, the width of each of the connection portions is equal to or smaller than the thickness of each of the core pieces, and $0.7 \leq Wm/(Tm \times Gm) \leq 3.3$ is satisfied, where Wm is the length of the long side of the embedded permanent magnet, Tm is the length of the short side of the permanent magnet, and Gm is the maximum distance from the outer circumference of the rotor to the permanent magnet.

Effect of the Invention

According to the permanent magnet motor of the present invention, the width of the connection portions and the size of the permanent magnets are adjusted, whereby a torque ripple can be reduced.

BRIEF DESCRIPTION OF THE DRAWINGS

FIGS. 5A to 5C are distribution diagrams in which values Wm/(Tm×Gm) are plotted for respective motor specifications according to embodiment 1 of the present invention, wherein FIG. 5A is a distribution diagram of the values Wm/(Tm×Gm) for respective motor specifications when a shoe connection width 18 is 0.125 mm; FIG. 5B is a distribution diagram of the values Wm/(Tm×Gm) for respective motor specifications when the shoe connection width 18 is 0.326 mm; and FIG. 5C is a distribution diagram of the values Wm/(Tm×Gm) for respective motor specifications when the shoe connection width 18 is 0.350 mm.

FIGS. 6A to 6C are graphs each showing a relationship between the shoe connection width 18 and the value Wm/(Tm×Gm) for each of the motor specifications of FIGS. 5A to 5C according to embodiment 1 of the present invention, wherein: FIG. 6A is a graph showing a relationship between the shoe connection width 18 and the value Wm/(Tm×Gm) for the motor specification in which the value Wm/(Tm×Gm) is the minimum value, among the motor specifications of FIGS. 5A to 5C; FIG. 6B is a graph showing a relationship between the shoe connection width 18 and the value Wm/(Tm×Gm) for the motor specification in which the value Wm/(Tm×Gm) is the average value, among the motor specifications of FIGS. 5A to 5C; and FIG. 6C is a graph showing a relationship between the shoe connection width 18 and the value Wm/(Tm×Gm) for the motor specification in which the value Wm/(Tm×Gm) is the maximum value, among the motor specifications of FIGS. 5A to 5C.

DESCRIPTION OF EMBODIMENTS

Embodiment 1

Figure 1:
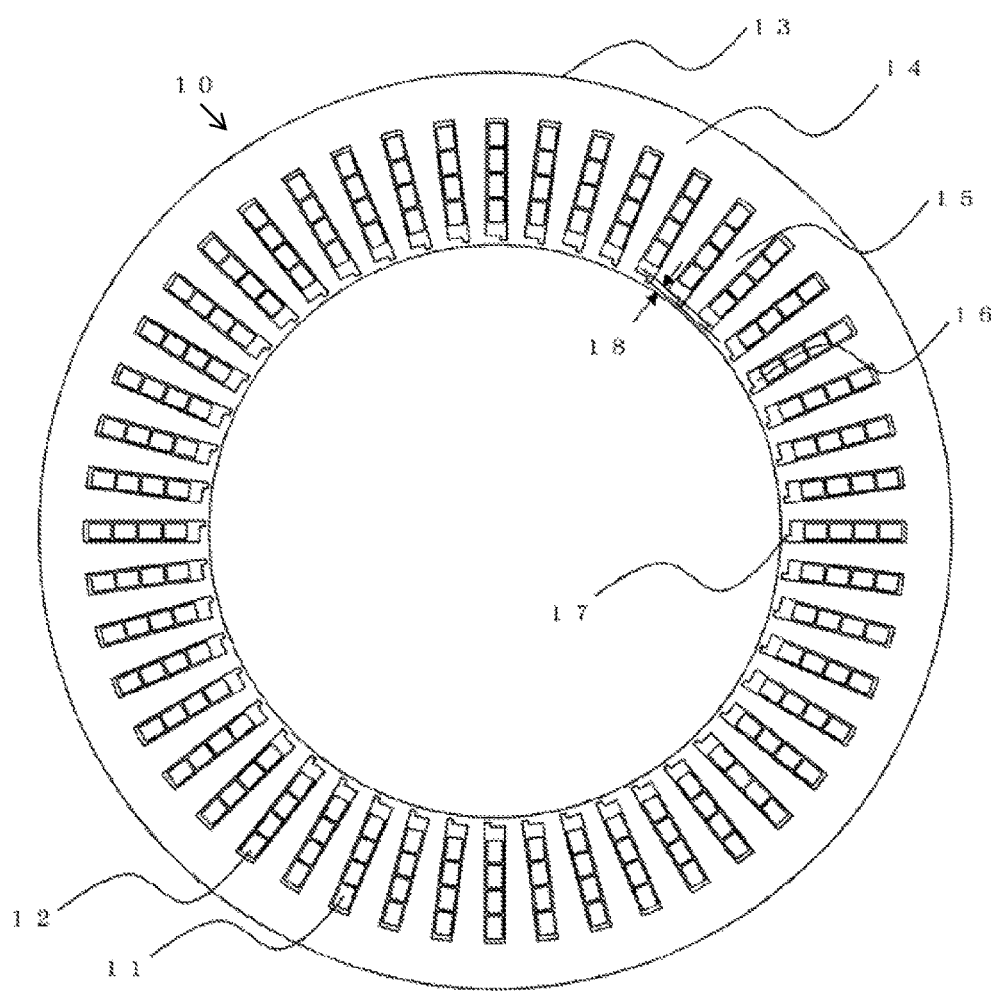
FIG. 1 is a cross-sectional view of a stator 10 of a permanent magnet motor according to embodiment 1 of the present invention.

FIG. 1 is a cross-sectional view of a stator 10 of a permanent magnet motor according to embodiment 1 of the present invention. The stator 10 is formed of an armature winding 11, an armature winding 12, and a stator core 13.

The stator core 13 is formed by stacking, in the axial direction, core pieces which are fabricated by stamping a magnetic material such as an electromagnetic steel sheet. The stator core 13 includes an annular core back 14 and teeth 15 each extending inward in the circumferential direction from the core back 14. The armature windings 11, 12 are housed in slots 16 formed between the adjacent teeth 15. Insulating paper sheets (not illustrated), etc. are inserted between the armature windings 11, 12 and the stator core 13 forming the slots 16, so that electrical insulation is ensured.

The number of the teeth 15 formed is 48 in total. Accordingly, the number of the slots 16 formed is also 48. Four coils of the armature windings 11, 12 are housed in each of the slots 16. Ends of the teeth 15 are connected to each other via connection portions 17 on radially inner sides with respect to the slots 16.

The armature winding 11 is formed of three phases including a U1 phase, a V1 phase, and a W1 phase. The armature winding 12 is formed of three phases including a U2 phase, a V2 phase, and a W2 phase. The armature windings 11, 12 are arranged in the slots 16 such that the U1 phase, the U2 phase, the W1 phase, the W2 phase, the V1 phase, and the V2 phase are arranged in this order in the first to sixth slots. Also in the seventh and subsequent slots, the U1 phase, the U2 phase, the W1 phase, the W2 phase, the V1 phase, and the V2 phase are arranged in this order. The same order arrangement is made throughout the first to the 48th slots. It is noted that, connection is made such that the direction of current flowing through the U1 phase coil arranged in the first slot is opposite to the direction of current flowing through the U1 phase coil arranged in the seventh slot. That is, a distributed winding is adopted in which a coil is wound from the first slot to the seventh slot. The armature windings 11, 12 are each provided across a total of six teeth 15. The six teeth 15 correspond to an electric angle of 180 degrees, and the short pitch factor is 1.

Further, the phase difference between the armature windings 11, 12 is an electric angle of 30 degrees, and the distributed winding factor is 1. Accordingly, the entire winding factor is also 1. Thus, the small-sized high torque motor is formed. Therefore, an electromotive force is larger and the cost is lower in this motor, compared with a motor having a small winding factor.

Figure 2:
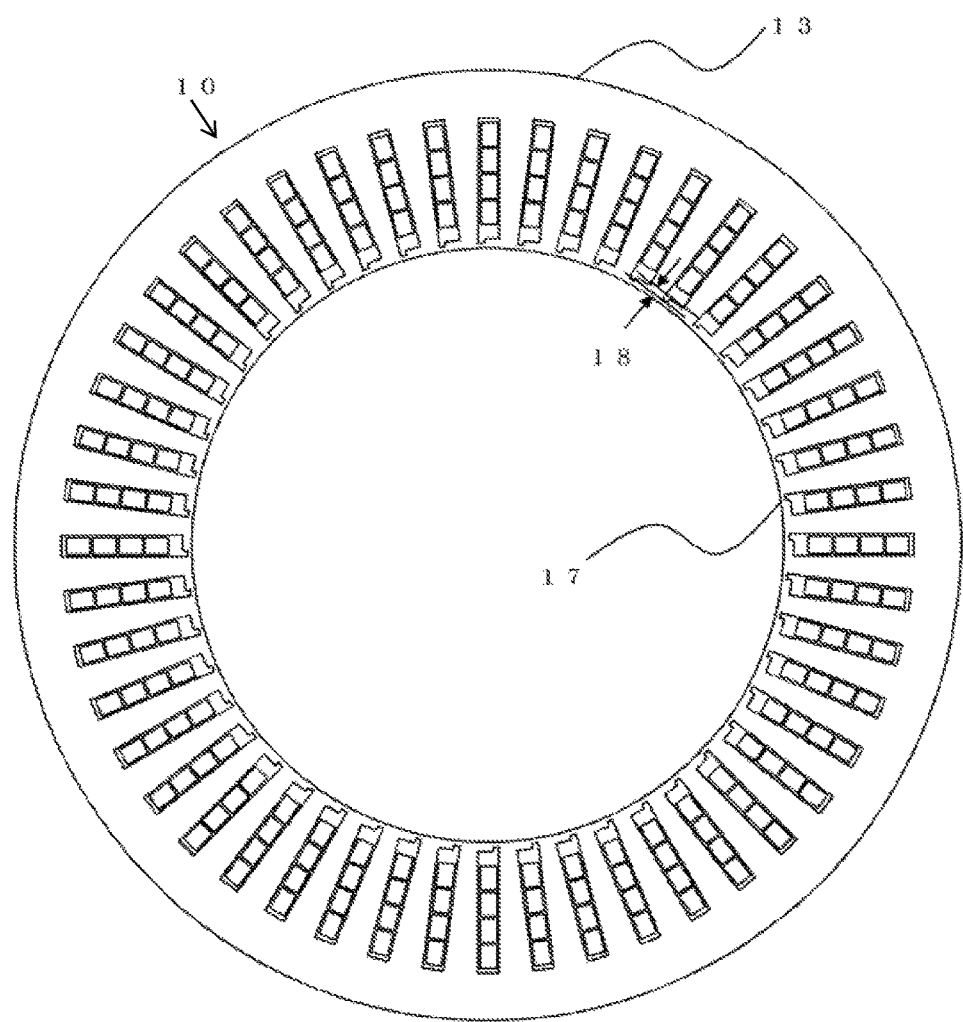
FIG. 2 is a cross-sectional view of a two-stage skew side of the stator 10 of the permanent magnet motor according to embodiment 1 of the present invention.

In addition, as illustrated in FIG. 2, from the half point of stacking in the axial direction, a stator core 13 is stacked which has teeth 15 each having an end shape symmetric with respect to the center axis of the tooth 15. That is, the stator core 13 is provided with a two-stage skew. For example, when the stator core 13 is provided with a two-stage skew the mechanical angle of which is approximately 1.875 degrees, the mechanical angle 96th-order component of a torque ripple can be reduced.

When the width (hereinafter, referred to as "shoe connection width") 18 in the radial direction of the connection portion at each end of the teeth 15 is large, a leakage magnetic flux increases and torque decreases. For this reason, the smaller shoe connection width 18 is more effective for downsizing of the motor.

Figure 3:
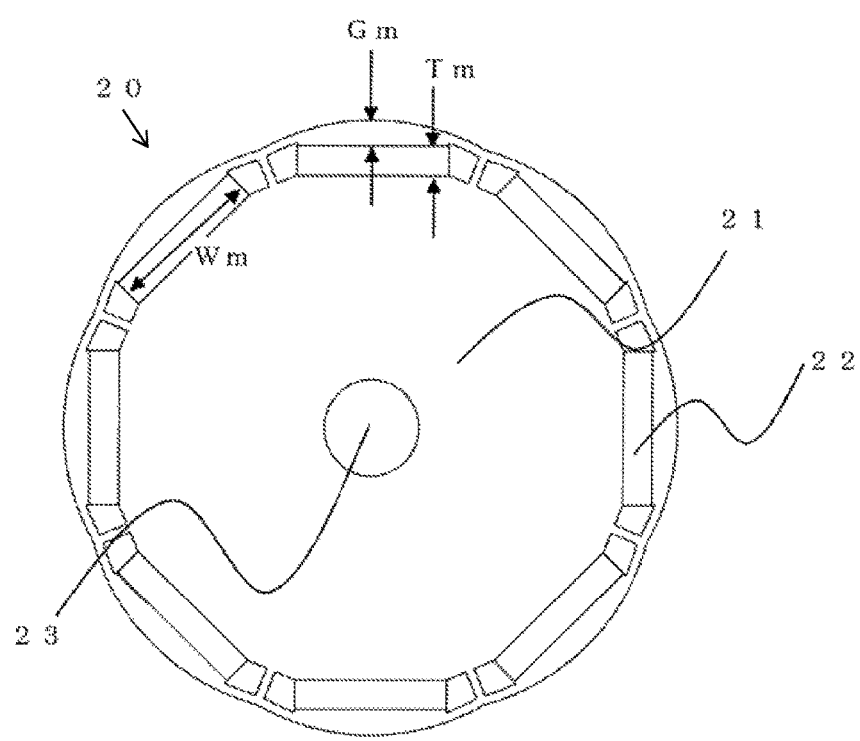
FIG. 3 is a cross-sectional view of a rotor of the permanent magnet motor according to embodiment 1 of the present invention.

FIG. 3 is a cross-sectional view of a rotor 20 of the permanent magnet motor according to embodiment 1 of the present invention.

The rotor 20 is formed of a rotor core 21 and permanent magnets 22 embedded in the rotor core 21, and is arranged inside the stator 10 with a magnetic gap between the rotor 20 and the stator 10. The permanent magnets 22 are neodymium rare earth magnets formed of neodymium, iron, and boron, and are each shaped into a rectangular shape having a rectangular cross section the long side (Wm) of which is in the circumferential direction and the short side (Tm) of which is the thickness in the radial direction. An 8-pole structure is formed by arranging eight permanent magnets 22 at equal intervals in the circumferential direction so as to be rotationally symmetric about a rotational shaft 23 of the rotor 20. Since any expensive heavy rare earth element such as dysprosium (Dy) or terbium (Tb), which improves a coercivity, is not added to the permanent magnets 22, the cost of the magnets can be reduced. In addition, with the configuration of the permanent-magnet embedded motor using the neodymium rare earth magnets, a small and light-weight motor in which the magnet torque is great, the reluctance torque can be utilized, and the torque per unit length is great, can be provided. Moreover, the rotor core 21 is formed into a flower-like circular shape having a radius smaller than that of a perfect circle, with respect to the rotational shaft 23, whereby the torque ripple can be reduced.

Similarly to the stator core 13, the rotor core 21 is provided with a two-stage skew. In the rotor core 21, rotor cores having the same shape are stacked in two stages. For example, when a two-stage skew the mechanical angle of which is approximately 3.75 degrees is provided, the mechanical angle 48-th component of a torque ripple can be reduced. The stator 10 and the rotor 20 are provided with the respective two-stage skews in this way, whereby torque ripples at the two specified degrees can be reduced. Reduction in the end widths of the teeth 15 and in the slot area of the stator core 13 is more likely to be avoided when the angle of the two-stage skew of the rotor 20 is increased, rather than that of the stator 10 in which the number of slots is great.

Figure 4:
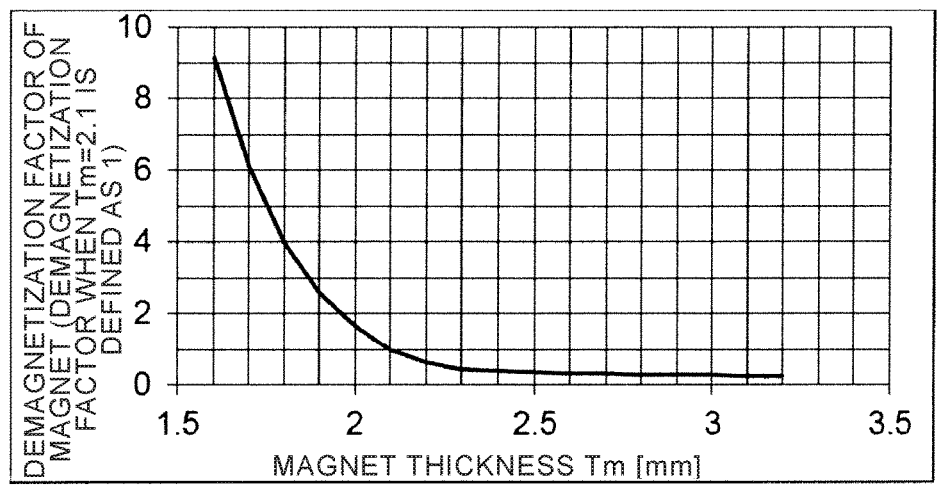
FIG. 4 is a graph showing the demagnetization factor of a permanent magnet according to embodiment 1 of the present invention.

FIG. 4 is a graph showing the demagnetization factor of a neodymium rare earth magnet with no addition of a heavy rare earth element that has a coercivity of 21 kOe or more at normal temperature. The horizontal axis represents a short side Tm (mm), which indicates the magnet thickness. As is found from the graph, when Tm becomes smaller than 2.1 mm, the demagnetization factor sharply deteriorates. In order to suppress reduction in torque due to demagnetization, the range of Tm 2 mm may be applied. However, during emergency avoiding steering, etc., a motor for electric power steering is required of assistance torque with a high rotation rate. For this reason, Tm is desirably set to be close to 2.1 mm because the rotation rate of the motor becomes lower when Tm is longer (the magnet thickness is larger).

As a result of the skew provided to the stator core 13 or the rotor core 21, reduction at the two specified ripple degrees including the 48-th degree and the 96-th degree can be achieved, as described above. A structure for further reducing the torque ripple is described in detail below.

Figure 5A:
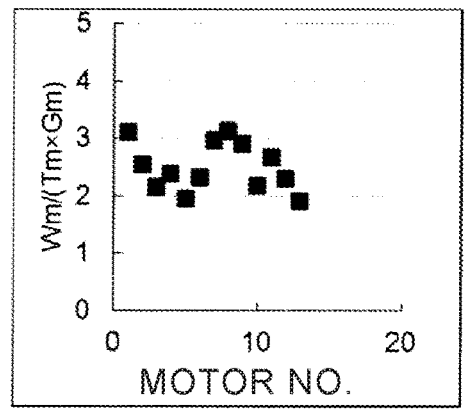
Figure 5B:
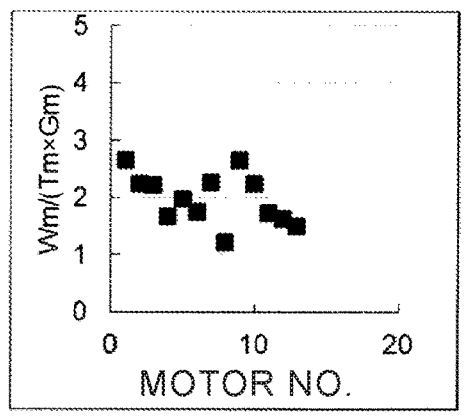
Figure 5C:
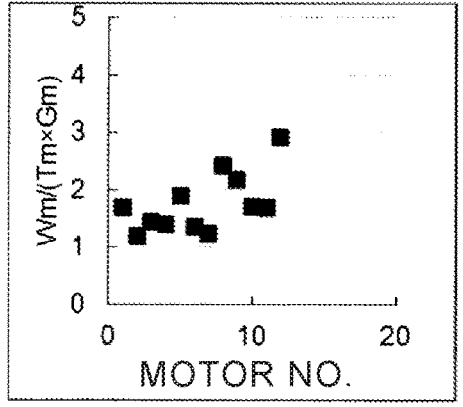

FIGS. 5A to 5C are distribution diagrams in which the values Wm/(Tm×Gm) for each motor specification are plotted by performing, under a condition in which torque ripple variation with respect to the average torque is equal to or lower than 0.5%, magnetic field analysis using three parameters of Wm (mm) representing the length of the long side of the magnet, Tm (mm) representing the length of the short side of the magnet, and Gm (mm) representing the maximum depth among the embedding depths from the rotor core to the respective long sides, as described above. The horizontal axis is each of motor specifications satisfying the aforementioned condition. The values Wm/(Tm×Gm) on the vertical axis are plotted for each of the motor specifications.

FIG. 5A shows a case where the shoe connection width 18 is 0.125 mm. FIG. 5B shows a case where the shoe connection width 18 is 0.326 mm. FIG. 5C shows a case where the shoe connection width 18 is 0.350 mm. It can be seen that the values Wm/(Tm×Gm) are distributed near the range from 1.0 to 3.0 in each of FIGS. 5A to 5C.

Figure 6A:
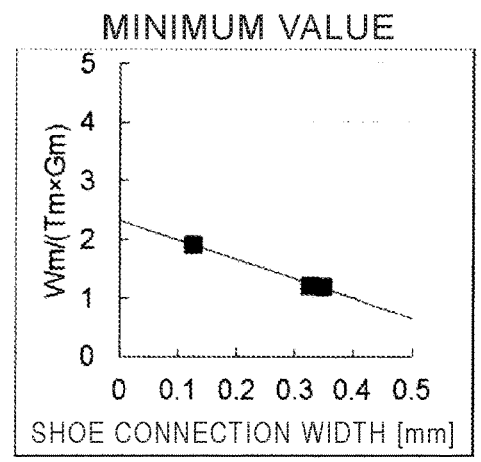
Figure 6B:
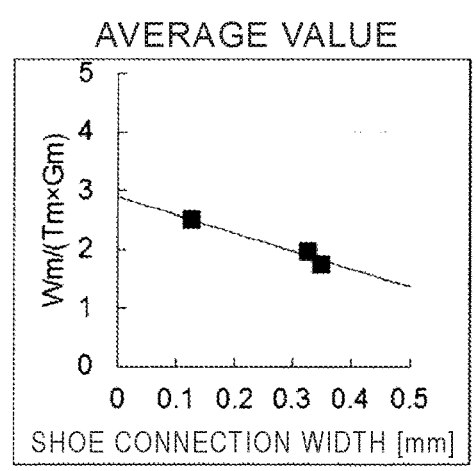
Figure 6C:
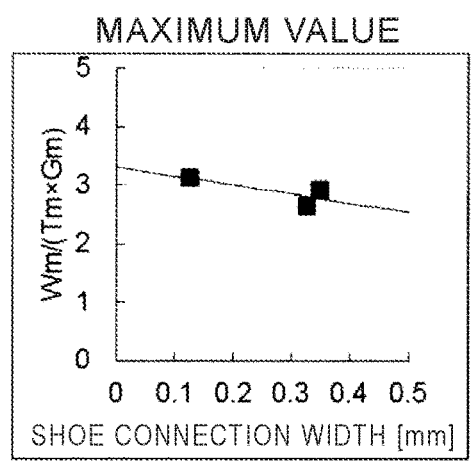

FIGS. 6A to 6C are graphs each showing a relationship, in one motor specification, between the shoe connection width 18 and the value Wm/(Tm×Gm) in FIGS. 5A to 5C. In FIG. 6A, one motor specification in which the value Wm/(Tm×Gm) with respect to the shoe connection width 18 is the minimum value, is plotted. In FIG. 6B, one motor specification in which the value Wm/(Tm×Gm) with respect to the shoe connection width 18 is the average value, is plotted. In FIG. 6C, one motor specification in which the value Wm/(Tm×Gm) with respect to the shoe connection width 18 is the maximum value, is plotted. In order to downsize the motor, it is desirable to shorten the shoe connection width because a leakage magnetic flux between the teeth is large when the shoe connection width 18 is large. However, as shown in FIGS. 6A to 6C, in the motor for electric power steering, a correlation is found in which the value Wm/(Tm×Gm) becomes greater as the shoe connection width 18 becomes smaller with respect to the plate thickness 0.5 mm of each of stacked core pieces. When the shoe connection width 18 is 0.5 mm or less, Wm/(Tm×Gm) is set to be not smaller than 0.7 but not greater than 3.3. As a result, the 48-th and 96-th torque ripple components, which are main components of a torque ripple, can be 0.5% or lower, and thus, the motor having a small torque ripple can be realized.

It is noted that, within the scope of the present invention, the above embodiment of the present invention may be modified or simplified as appropriate.

DESCRIPTION OF THE REFERENCE CHARACTERS

10 stator
11, 12 armature winding
13 stator core
14 core back
15 tooth
16 slot
17 connection portion
18 shoe connection width
20 rotor
21 rotor core
22 permanent magnet
23 rotary shaft

The invention claimed is:

1. A permanent magnet motor comprising:
a stator including a stator core obtained by stacking annular core pieces each having a plurality of teeth, and including an armature having windings housed in slots formed between the plurality of teeth; and
a rotor which is arranged inside the stator with a magnetic gap therebetween and which rotates about a rotary shaft, the rotor having a permanent magnet which is embedded therein and has a flat plate-like cross section, wherein
the permanent magnet motor has flange parts provided on rotor-side ends of the teeth, and has connection portions at which the respective flange parts are connected to each other in the circumferential direction of the stator,
the width of each of the connection portions is equal to or smaller than the thickness of each of the core pieces, and
$0.7 \leq Wm/(Tm \times Gm) \leq 3.3$ is satisfied, where Wm is the length of the long side of the permanent magnet, Tm is the length of the short side of the permanent magnet, and Gm is the maximum distance from the outer circumference of the rotor to the permanent magnet.

2. The permanent magnet motor according to claim 1, wherein the rotor is formed of a rotor core provided with a two-stage skew.

3. The permanent magnet motor according to claim 1, wherein the permanent magnet has a short side the length Tm of which is 2 mm or longer, and no heavy rare earth element is added to the permanent magnet.

4. The permanent magnet motor according to claim 2, wherein the permanent magnet has a short side the length Tm of which is 2 mm or longer, and no heavy rare earth element is added to the permanent magnet.

* * * * *